(12) United States Patent
Barr et al.

(10) Patent No.: US 10,482,289 B2
(45) Date of Patent: Nov. 19, 2019

(54) COMPUTING DEVICE TO PROVIDE ACCESS CONTROL TO A HARDWARE RESOURCE

(71) Applicant: QUALCOMM Incorporated, San Diego, CA (US)

(72) Inventors: David Barr, Carmiel (IL); Dafna Shaool, Binyamina (IL); Rahul Gulati, San Diego, CA (US); Pranjal Bhuyan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 15/685,795

(22) Filed: Aug. 24, 2017

(65) Prior Publication Data

US 2019/0065785 A1 Feb. 28, 2019

(51) Int. Cl.
| | | |
|---|---|---|
| G06F 21/00 | (2013.01) | |
| G06F 21/70 | (2013.01) | |
| G06F 21/50 | (2013.01) | |
| G06F 21/62 | (2013.01) | |
| G06F 9/50 | (2006.01) | |

(52) U.S. Cl.
CPC .............. *G06F 21/70* (2013.01); *G06F 21/50* (2013.01); *G06F 21/6218* (2013.01); *G06F 9/5011* (2013.01)

(58) Field of Classification Search
CPC .................................................. G06F 21/70
See application file for complete search history.

(56) References Cited

U.S. PATENT DOCUMENTS

| 10,134,139 | B2* | 11/2018 | Gulati ...................... G06T 7/001 |
| 2013/0346783 | A1* | 12/2013 | Weber ................. G06F 11/3058 713/340 |
| 2015/0057908 | A1* | 2/2015 | Carbonaro .............. F02D 29/02 701/102 |
| 2015/0242233 | A1* | 8/2015 | Brewerton .......... G06F 9/30043 710/308 |
| 2015/0254017 | A1* | 9/2015 | Soja ...................... G06F 3/0622 711/103 |
| 2016/0080376 | A1* | 3/2016 | Temple .................... H04L 9/00 713/170 |

(Continued)

FOREIGN PATENT DOCUMENTS

WO WO-2016162624 A1 10/2016

OTHER PUBLICATIONS

International Search Report and Written Opinion—PCT/US2018/044061—ISA/EPO—dated Oct. 30, 2018.

*Primary Examiner* — Harris C Wang
(74) *Attorney, Agent, or Firm* — Robert A. Reid (57) ABSTRACT

A computing device includes a hardware resource, a component to send a transaction signal including a target address of the hardware resource, a security data associated with an initiator of the transaction signal, and a safety data associated with the initiator, and an access control unit coupled to the component and the hardware resource, the access control unit to receive the transaction signal, determine whether security access is granted based on the transaction signal, determine whether safety access is granted based on the transaction signal, and allow access to the hardware resource based on both the security access and the safety access being granted.

25 Claims, 8 Drawing Sheets

| Resource | SM | SFID | Access |
|---|---|---|---|
| Safety master | 1 | xxx | Safety configurations only |
| ASIL-D | 0 | 1xx | ASIL-D only |
| ASIL-C | 0 | 011 | ASIL-C only |
| ASIL-B | 0 | 010 | ASIL-B only |
| ASIL-A | 0 | 001 | ASIL-A only |
| QM | 0 | 000 | QM only (Quality Managed = not safe) |

(56) References Cited

U.S. PATENT DOCUMENTS

| | | | |
|---|---|---|---|
| 2016/0110241 A1* | 4/2016 | Busch | G06F 11/1012 |
| | | | 714/54 |
| 2018/0107615 A1* | 4/2018 | Egi | G06F 13/00 |
| 2019/0049914 A1* | 2/2019 | Munafo | G05B 19/0428 |
| 2019/0065785 A1* | 2/2019 | Barr | G06F 21/50 |

* cited by examiner

| Resource | NS | Access |
|---|---|---|
| Non-secure | 1 | Hypervisor / HLOS (non-trusted transaction) |
| | 0 | TEE (trusted transaction, can access non-secure resource) |
| Secure | 0 | TEE (only trusted transaction can access secure resource) |

| Resource | SM | SFID | Access |
|---|---|---|---|
| Safety master | 1 | xxx | Safety configurations only |
| ASIL-D | 0 | 1xx | ASIL-D only |
| ASIL-C | 0 | 011 | ASIL-C only |
| ASIL-B | 0 | 010 | ASIL-B only |
| ASIL-A | 0 | 001 | ASIL-A only |
| QM | 0 | 000 | QM only (Quality Managed = not safe) |

COMPUTING DEVICE TO PROVIDE ACCESS CONTROL TO A HARDWARE RESOURCE

BACKGROUND

Field

An aspect of the present invention relates to a computing device to provide access control to a hardware resource.

Background

In a computing device, such as an automotive System on Chip (SoC) for a system which includes multiple functions such as infotainment, Instrument Cluster, and ADAS (Advanced Driver-Assistance System), applications or software with multiple safety goals such as safety goals classified to different Automotive Safety Integrity Levels (ASILs) according to ISO-26262 may co-exist.

Such applications must be isolated from each other so that those with lower ASIL levels do not contaminate those with higher ASIL levels. These safety tasks may or may not be classified into different security classes; the safety classification of a task is generally orthogonal to its security classification.

Current access control implementations for such automotive SoCs when used for security do not provide any form of safety isolation. For example, something that is secure is not necessarily safe, and vice versa. For example, in an Automotive IVI (In-Vehicle Infotainment) SoC, the payment applications require a high security classification but have no safety requirement. In contrast, the instrument cluster display task requires a medium ASIL (e.g., A or B) classification but has no security requirement. These two tasks could run concurrently. In the general case, a task can have both security and safety requirements. What is needed therefore is a scheme in which both safety and security requirements are used to provide access control.

SUMMARY

In one aspect, a computing device includes a hardware resource, a component to send a transaction signal including a target address of the hardware resource, a security data associated with an initiator of the transaction signal, and a safety data associated with the initiator, and an access control unit coupled to the component and the hardware resource, the access control unit to receive the transaction signal, determine whether security access is granted based on the transaction signal, determine whether safety access is granted based on the transaction signal, and allow access to the hardware resource based on both the security access and the safety access being granted.

In another aspect, a computing device includes means for sending a transaction signal, the transaction signal including a target address of a hardware resource, a security data associated with an initiator of the transaction signal, and a safety data associated with the initiator, means for receiving the transaction signal, means for determining whether security access is granted based on the transaction signal, means for determining whether safety access is granted based on the transaction signal, and means for allowing access to the hardware resource based on both the security access and the safety access being granted.

In yet another aspect, a method operational in a computing device includes sending, by a component, a transaction signal, the transaction signal including a target address of a hardware resource, a security data associated with an initiator of the transaction signal, and a safety data associated with the initiator, receiving, by an access control unit, the transaction signal, determining, by the access control unit, whether security access is granted based on the transaction signal, determining, by the access control unit, whether safety access is granted based on the transaction signal, and allowing, by the access control unit, access to the hardware resource based on both the security access and the safety access being granted.

In yet another aspect, a non-transitory, computer-readable medium, having stored thereon computer-readable instructions for providing access control to a hardware resource, comprising instructions configured to cause a computing device to send a transaction signal, the transaction signal including a target address of the hardware resource, a security data associated with an initiator of the transaction signal, and a safety data associated with the initiator, receive the transaction signal, determine whether security access is granted based on the transaction signal, determine whether safety access is granted based on the transaction signal, and allow access to the hardware resource based on both the security access and the safety access being granted.

DETAILED DESCRIPTION

Figure 1:
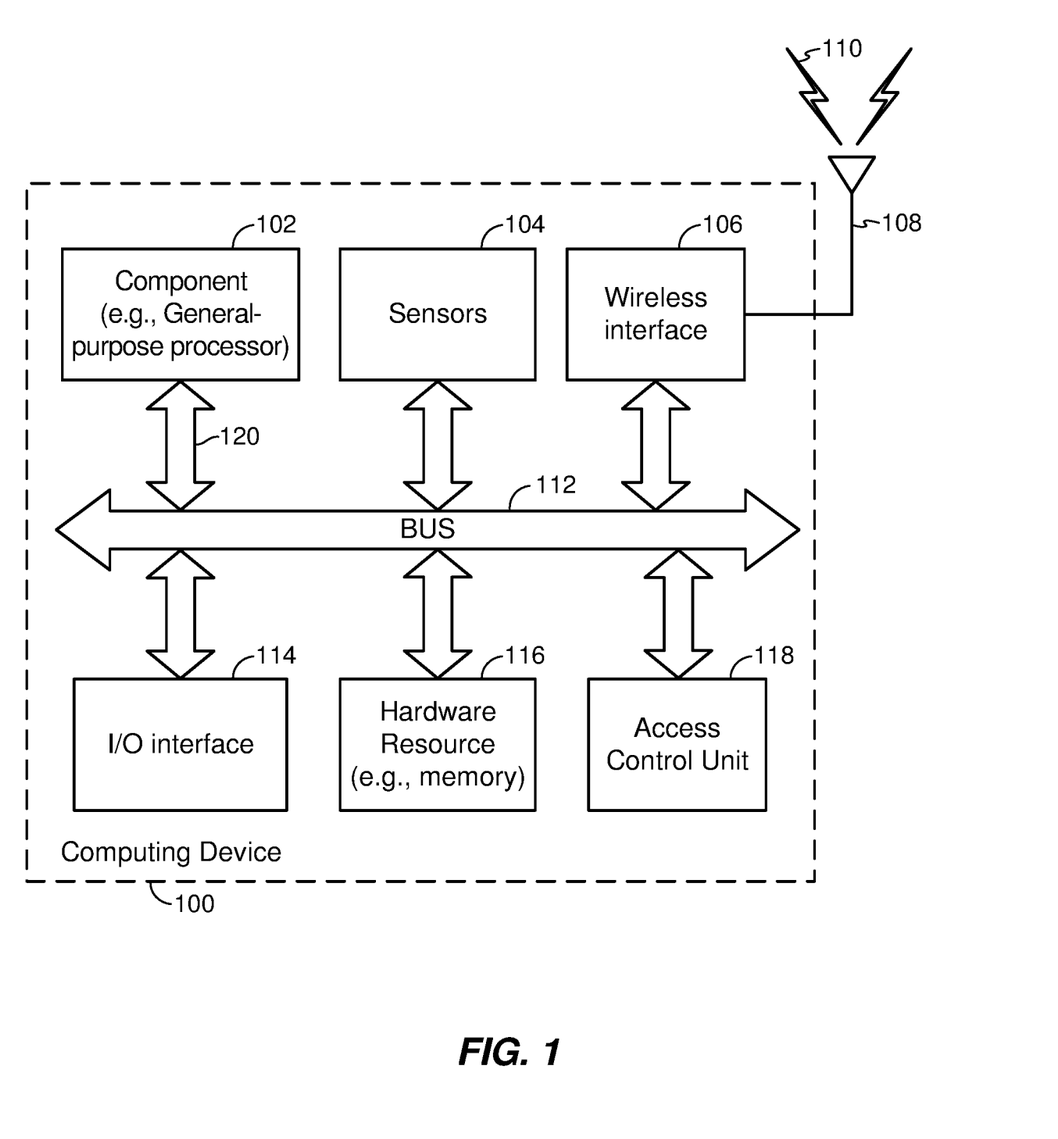
FIG. 1 is a block diagram of a computing device according to an aspect of the present invention.

With reference to FIG. 1, a computing device 100 includes a hardware resource 116, a component 102 to send a transaction signal 120 including a target address of hardware resource 116, a security data associated with an initiator of transaction signal 120, and a safety data associated with the initiator, and an access control unit 118 coupled to component 102 and hardware resource 116, access control unit 118 to receive transaction signal 120, determine whether security access is granted based on transaction signal 120, determine whether safety access is granted based on transaction signal 120, and allow access to hardware resource 116 based on both the security access and the safety access being granted. In one aspect, component 102 can be any suitable hardware master component such as a general-purpose processor or a DMA (Direct Memory Access) controller. In one aspect, hardware resource 116 can include a memory, peripherals such as serial interfaces (e.g., I2C (Inter-Integrated Circuit), SPI (Serial Peripheral Interface)), GPIO (General Purpose Input Output), flash memory controllers, or audio interfaces. In one aspect, the initiator of transaction signal 120 can be any suitable software/application such as a payment software/application or hardware such as a radio, a vehicle driver assistance system, a vehicle instrument cluster each working in conjunction with component 102. Computing device 100 can be used to implement a process illustrated in FIG. 2 to be described in more detail below. Examples of computing device 100 include an integrated circuit such as a System on Chip (SoC), an automotive infotainment system, an Advanced Driver-Assistance System (ADAS), an industrial robot, a drone, or an end user device such as a mobile device, a laptop, or a tablet.

In one aspect, the security data associated with the initiator includes one or more bits (NS, see FIG. 3) indicating a security level of the initiator. The target address can be a memory address or an address of a peripheral. In another aspect, the security data associated with the initiator includes an access domain identifier (ADID) which uniquely identifies an access domain such as a trusted master which can be a trusted execution environment, a modem, or a secure processor. Access domains can also include non-trusted masters. Safety data associated with the initiator includes a safety identifier (for example, SFID 506, see FIG. 5) which identifies one of a plurality of safety levels. Transaction signal 120 can include a safety master identifier (SM 504, see FIG. 5) which includes a bit indicating a Safety Master which may be software running on a processor (e.g., general-purpose processor 102). In one aspect, the Safety Master can only access safety access configuration control registers 602 (see FIG. 6A) in access control unit 118. In one aspect, access control unit 118 includes a logic element 620 (see FIG. 6A) to allow access to hardware resource 116 based on both the security access and the safety access being granted. In another aspect, logic element 620 can include an AND gate, as shown in FIG. 6A. Logic element 620 in the access control checks that the initiator's safety and security data are consistent with the safety and security policies that are defined in the access control element configuration registers 602, 612 (see FIG. 6A).

Continuing with FIG. 1, computing device 100 includes component 102 (for example, a general-purpose processor), sensors 104, a wireless interface 106, an I/O interface 114, access control unit 118, and hardware resource 116 (for example, a non-transitory memory), connected to each other by a bus 112. Other implementations of computing device 100 may include additional elements not illustrated in the example implementation of FIG. 1 and/or may not include all of the elements illustrated in the example embodiment illustrated in FIG. 1. For example, some implementations of computing device 100 may not include wireless interface 106.

Wireless interface 106 can include a wireless receiver, transmitter, transceiver, and/or other elements that enable computing device 100 to send and/or receive data using WWAN, WLAN, and/or other suitable wireless communication protocols. Wireless interface 106 can include one or more multi-mode modems capable of transmitting and receiving wireless signals using multiple wireless communications standards. Wireless interface 106 is connected by a line 108 to an antenna 110 for sending and receiving communications to/from other wireless transmitters, a wireless base station, and/or other wireless devices configured to communicate using wireless communication protocols. While computing device 100 illustrated in FIG. 1 includes a single wireless interface 106 and a single antenna 108, other implementations of the computing device 100 can include multiple wireless interfaces 106 and/or multiple antennas 108.

I/O interface 114 can provide one or more ports and/or other interfaces that can provide for data inputs and/or outputs to computing device 100. For example, I/O interface 114 can include PCIe or one or more ports, such as a Universal Serial Bus (USB) port and/or other type of port that can be used to connect external devices to the computing device. I/O interface 114 can also include one or more input devices, such as buttons, switches, a keypad, a touchscreen and/or other means for receiving input from a user. I/O interface 114 can also include one or more means for outputting audio and/or visual content, such as a screen, a speaker, a headphone port and/or other means for outputting such content.

Sensors 104 can include one or more sensors 104 that can be configured to collect data. Sensors 104 can include one or more of each of the following: an accelerometer, a fingerprint scanner, a gyroscope, a light sensor, a gesture sensor, a proximity sensor, or a combination thereof. Some of sensors 104 may be integrated into computing device 100, which others may be external to computing device 100 and can provide sensor data to computing device 100 via a wired or wireless connection with computing device 100. Sensors 104 can also include other types of sensors in addition to or instead of those discussed herein.

In one aspect, component 102 can include a processor which can be an intelligent device, e.g., a personal computer central processing unit (CPU) such as those made by Intel® Corporation or AMD®, a microcontroller, an application specific integrated circuit (ASIC), etc. In one aspect, hardware resource 116 can include a memory which can be a non-transitory storage device that can include random access memory (RAM), read-only memory (ROM), or a combination thereof. Such a memory can store processor-readable, processor-executable software code containing instructions for controlling the processor to perform functions described herein (although the description may read that the software performs the function(s)). The software can be loaded onto the memory by being downloaded via a network connection, uploaded from a disk, etc. Further, the software may not be directly executable, e.g., requiring compiling before execution.

The software in the memory is configured to enable the processor to perform various actions, including implementing sending and/or receiving data from other wireless transmitters, a wireless base station, other computing devices, and/or other devices configured for wireless communication.

Figure 2:
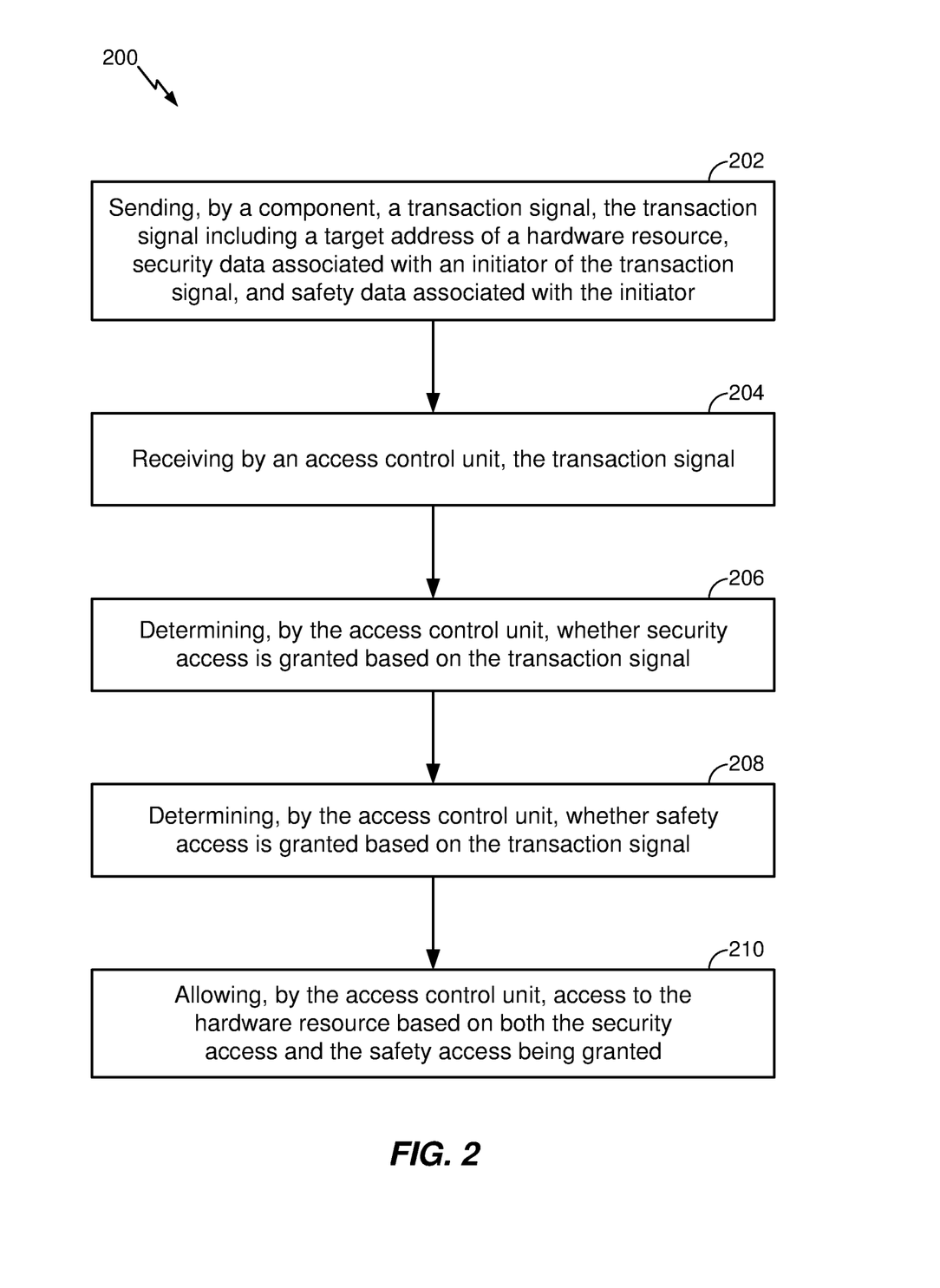
FIG. 2 is a flow diagram which can be implemented in the computing device of FIG. 1.

With reference to FIG. 2, a process 200 operational in computing device 100 includes sending (202), by a component, a transaction signal, the transaction signal including a target address of a hardware resource, a security data associated with an initiator of the transaction signal, and a safety data associated with the initiator, receiving (204) by an access control unit, the transaction signal, determining (206), by the access control unit, whether security access is granted based on the transaction signal, determining (208), by the access control unit, whether safety access is granted based on the transaction signal, and allowing, (210) by the access control unit, access to the hardware resource based on both the security access and the safety access being granted.

Figure 3:
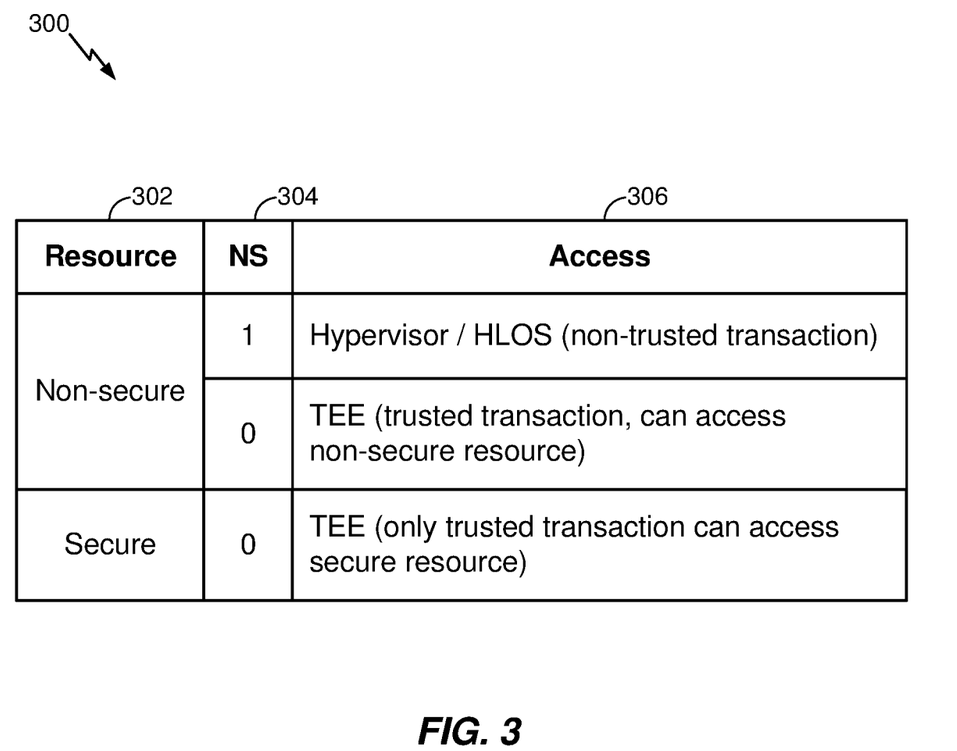
FIG. 3 is an example of security levels according to an aspect of the present invention.

With reference to FIG. 3, a security level chart 300 includes a resource 302, security data 304, and access 306. Security data 304 includes one or more NS (Non-Secure transaction) bits which in the example shown NS is represented by a single bit where a bit 0 indicates a secure transaction and a bit 1 indicates a non-secure transaction. If the NS bit is 1, then access to a non-secure resource is given, for example, to a Hypervisor or a High-Level Operating System (HLOS). If the NS bit is 0, a non-secure resource can be accessed by, for example, a Trusted Execution Environment (TEE). In another aspect, if the NS bit is 0, then only a trusted transaction can access a secure resource, for example, by the TEE. As another example, security data 304 could include a secure-bit in which a bit 1 indicates secure and a bit 0 indicates non-secure.

Figure 4:
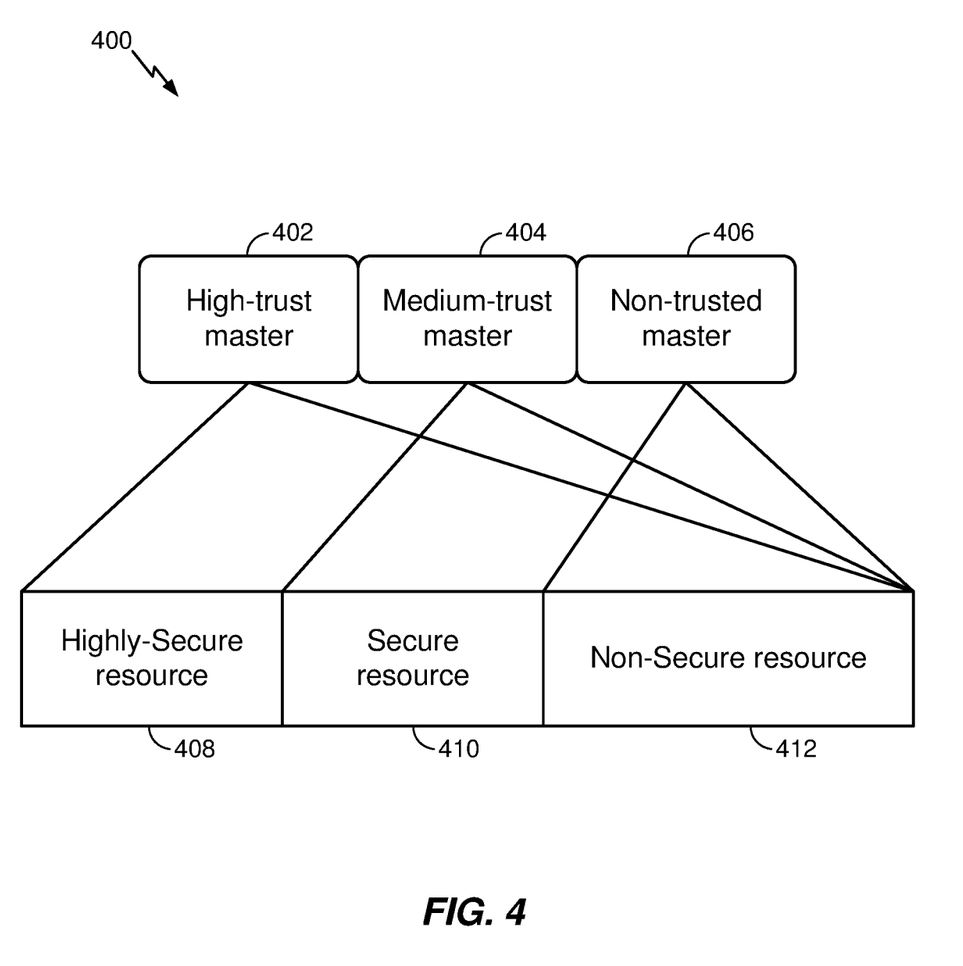
FIG. 4 is an example of multiple trust levels having access to multiple resources.

With reference to FIG. 4, the number of trust or security levels 400 can be increased which in the example shown includes three trust/security levels 402, 404, and 406. High-trust master 402 is allowed to access a highly secure resource 408, a secure resource 410, and a non-secure resource 412. Medium-trust master 404 is allowed to access secure resource 410 and non-secure resource 412. Non-trusted master 406 is allowed to access non-secure resource 412. As shown in FIG. 4, higher trust-levels have a superset of a lower trust-level's capabilities. This allows multiple trust levels within the same access domain.

Figure 5:
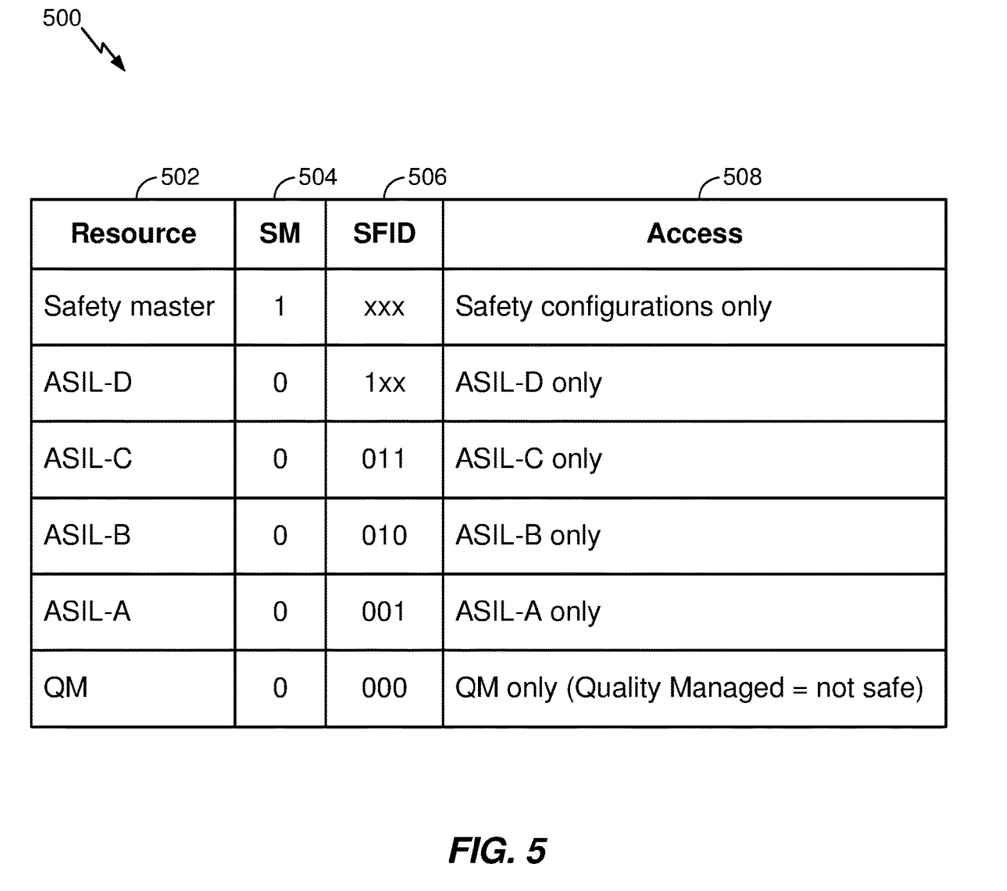
FIG. 5 is an example of safety levels associated with different resources.
Figure 6A:
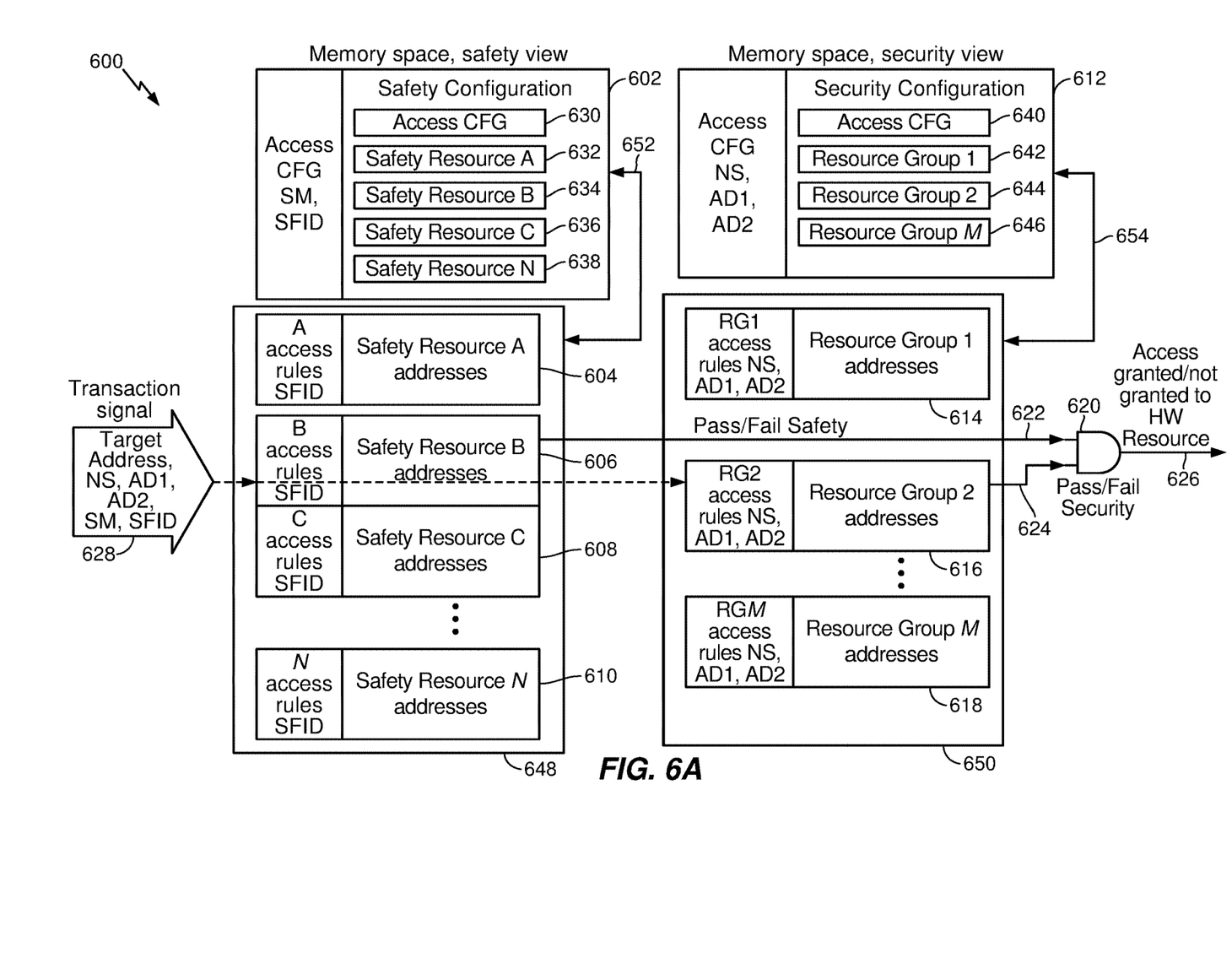
FIG. 6A is an example of an access control scheme according to an aspect of the present invention.

With reference to FIG. 5, a safely level chart 500 includes a resource 502, a Safety Master (SM) 504, a Safety Identification (SFID) 506 defining multiple safety levels, and access 508. The functional safety (ASIL) levels defined according to ISO-26262 are shown merely for illustrative purposes and aspects of the present invention are not limited to such safety levels. SFID 506 is a transaction metadata or safety data defined by one or more bits which in the example shown includes three bits. Other examples of SFID encoding schemes may have less than or greater than three bits. SM 504 is defined by a single bit which in the example shown, a bit 1 indicates a Safety Master and a bit 0 indicates a non-Safety Master. Starting from the bottom of chart 500, a transaction signal including a SM of 0 and a SFID of 000 allows access to a QM (Quality Managed=not safe) resource, a transaction signal including a SM of 0 and a SFID of 001 allows access to an ASIL-A only resource, etc. A transaction signal including a SM of 1 allows the Safety Master to access safety configurations only.

Examples of secure and safe use cases include vehicle to vehicle communication, remote engine stop, remote diagnostics, and secure in-vehicle communication. Examples of not secure but safe use cases include instrument cluster tell-tales, surround-view camera, and passive lane detection. Examples of secure and not safe use cases include payments, disk encryption, DRM protected video playback, and part attestation. Examples of not secure and not safe use cases include music, browsers, and air conditioner.

With reference to FIG. 6A, an example access control 600 included within access control unit 118 (see FIG. 1) is shown which includes safety configuration registers 602, a safety gate 648, security configuration registers 612, a security gate 650, and logical element 620 which in the example shown is an AND gate. Safety configuration registers 602 includes multiple safety registers 630, 632, 634, 636, and 638. Security configuration registers 612 includes multiple security registers 640, 642, 644, and 646. Safety gate 648 includes safety resource A addresses 604, safety resource B addresses 606, safety resource C addresses 608, safety resource N addresses 610 each with respective access rules and SFID. Security gate 650 include a security resource group 1 addresses 614, security resource group 2 addresses 616, and security resource group M addresses 618 each with respective access rules, NS, and AD1, and AD2. Safety resources are defined by their addresses and their safety levels. Security resources are defined by their addresses and their security levels. Resources may be memory areas, peripherals, and CSRs. Every resource has both a security level and a safety level associated with it. A hardware resource may have its own access control unit or an access control unit may control multiple hardware resources.

Continuing with FIG. 6A, a transaction signal (aka, transaction) is received by access control 600 on a bus 628 from component 102 (see FIG. 1) which can be a general-purpose processor. Transaction signal includes, along with suitable payload data, one or more of a target address, an NS, access domain identifiers AD1, AD2, a SM, and a SFID as previously described. The target address is a target address of a hardware resource such as memory 116 (see FIG. 1), NS is an example of security data associated with an initiator of the transaction signal, and the SFID is an example of a safety data associated with the initiator. In an example in which hardware resource is memory 116, target address may be a memory address. For higher or more stringent safety levels (e.g., higher ASIL levels such as ASIL-C and ASIL-D), transaction signal may include a source ID which is an ID of a component sending or originating the transaction signal. Access control 600 examines the target address and determines which Security Resource Group and which Safety Resource are being accessed. Security Access control checks NS and/or ADi from the transaction signal and determines if security access is granted. Safety Access control checks SFID and SM and from the transaction signal determines if safety access is granted. Access is granted if and only if both Safety and Security accesses are granted. Safety and security checks can be performed in parallel within access control 600 to reduce transaction overhead (latency).

Continuing with FIG. 6A, logic element 620 in access control 600 checks that the initiator's safety and security data are consistent with the safety and security policies that are defined, respectively, in safety configuration registers 602 and security configuration registers 612. For example, a pass/fail safety signal 622 associated with safety resource B addresses 606 and a pass/fail security signal 624 associated with resource group 2 addresses 616 are inputted to logical element 620 which outputs a signal 626 allowing (pass) or not allowing (fail) access, to the initiator, to the hardware resource identified by the target address. In this way, both the security data and the safety data associated with the initiator are used to implement access control of a hardware resource.

Figure 6B:
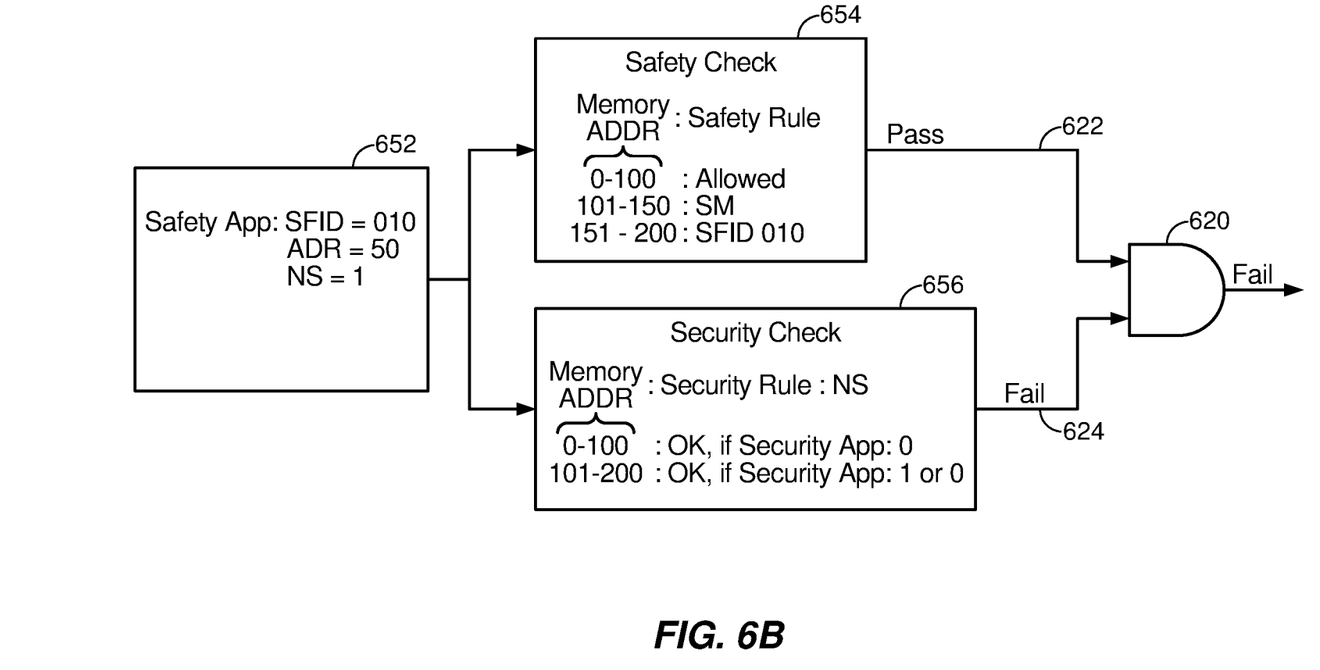
FIG. 6B is an example of access control for a safety application.

With reference to FIG. 6B, an example of safety and security checks is shown in which an initiator is a safety application 652. A component (e.g., a general-purpose processor) included within an automotive infotainment system runs such a safety application such that the component sends a transaction signal as described above. Such a transaction signal associated with safety application 652 includes, among other things, a SFID=010, a target memory address=50, and NS=1. A safety check 654 is performed which in this example, target memory address=50 falls within memory address range 0-100 (654) associated with a safety rule of "allowed" (i.e., memory address range 0-100 can be accessed by any initiator). Hence, safety check 654 results in a pass signal. A security check 656 is also performed, for example concurrently with safety check 654, which in this example, target memory address=50 falls within memory address range 0-100 (656) associated with a security rule of "OK, if security application" in which NS=0. Hence, security check 656 results in a fail signal since Safety application 652 is associated with an NS=1. In this example, logical element 620 outputs a fail signal or "access not granted" signal since one of its inputs is a fail signal. Therefore, safety application 652 is not allowed access to memory address=50 of memory 116 (see FIG. 1).

Figure 6C:
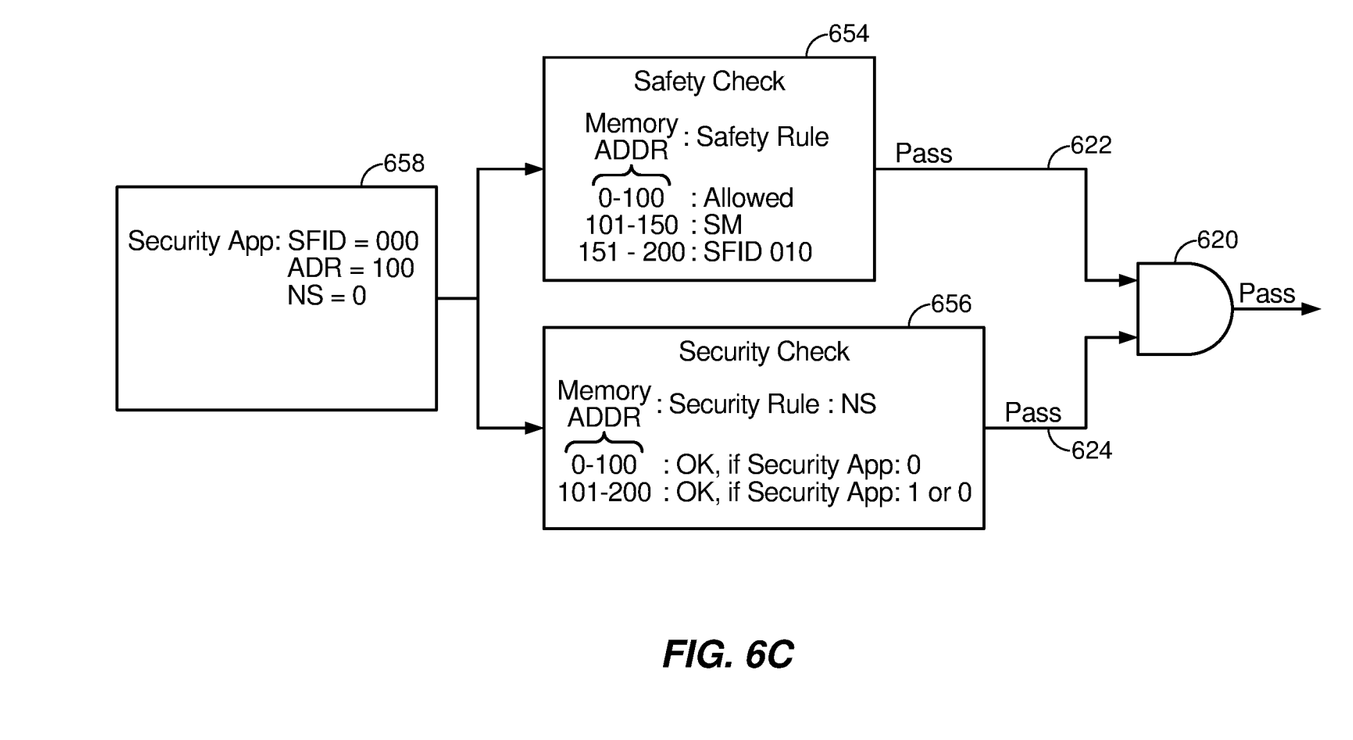
FIG. 6C is an example of access control for a security application.

With reference to FIG. 6C, an example of safety and security checks is shown in which an initiator is a security application 658 such as a payment application. A component (for example, a general-purpose processor) included within an automotive infotainment system runs such a security application such that the component sends a transaction signal as described above. Such a transaction signal associated with security application 658 includes, among other things, a SFID=000, a target memory address=100, and NS=0. A safety check 654 is performed which in this example, target memory address=100 falls within memory address range 0-100 (654) associated with a safety rule of "allowed" (i.e., memory address range 0-100 can be accessed by any initiator). Hence, safety check 654 results in a pass signal. A security check 656 is also performed which in this example, target memory address=100 falls within memory address range 0-100 (656) associated with a security rule of "OK, if security application" in which NS=0. Hence, security check 656 results in a pass signal since Security application 658 is associated with an NS=0. In this example, logical element outputs a pass signal or "access granted" signal since both of its inputs are a pass signal. Therefore, security application 658 is allowed access to memory address=100 of memory 116 (see FIG. 1).

The Safety Master, if it exists, is at the highest ASIL classification on the device. There may be other masters with the same ASIL level, but none higher. Transaction signals with SM=1 cannot access Safety Resources. Such a transaction signal with SM=1 can access only safety configuration registers. A SM can reconfigure safety access control, i.e. fall back to "safe-mode" if a fault is detected. A SM can lock out non-SMs from safety configuration registers. A Safety Master is secure. Otherwise, it could be subverted and be used to compromise the safety configuration. When not acting as a configuration safety master, the SM will output transactions with SM=0.

Access permission to the access-control configuration registers is separate from the transaction signal checking. However, it is at least as safe as the access to the resource, i.e., the SFID of a transaction signal that configures a resource must be ≥ the SFID of a transaction that can access the resource. Different security accesses may be defined for resource configuration and resource access. For example, an ASIL-B resource could have Configuration access={SFID=ASIL-B, Secure safety management process} and Resource access={SFID=ASIL-B, Non-secure Ethernet driver process}. Configuring the SFID that a master can drive onto a transaction signal includes Masters that authenticate their own software. For example, during boot, read a SFID_MAX value from the authenticated image for each resource and write the value to a write-once register that controls SFID output. This will also be the permission required to configure the access control of that resource. Masters that do not authenticate their own software will be configured by a self-authenticating master during boot, and locked. Safety resource and security resource boundaries do not have to align. Safety and security resources are not necessarily 1 to 1 mapped. Access control can be master-side or slave-side (or even both for high ASIL implementation). The resource safety configuration control, and the allow/not allow decision logic can be implemented according to the ISO-26262 requirements at the highest ASIL level that can be supported by the protected resource. Denial of service might be caused by faulty or malicious processes reconfiguring safety and/or security access control. This could be prevented by (but not limited to) locking configurations at system initialization, safety and security masters being both safe and secure, or periodic measurement of safety and security configurations.

An aspect of the present invention includes computing device 100 including means for sending a transaction signal, the transaction signal including a target address of a hardware resource, a security data associated with an initiator of the transaction signal, and a safety data associated with the initiator (e.g., component 102), means for receiving the transaction signal (e.g., access control unit 118), means for determining whether security access is granted based on the transaction signal (e.g., access control unit 118), means for determining whether safety access is granted based on the transaction signal (e.g., access control unit 118), and means for allowing access to the hardware resource based on both the security access and the safety access being granted (e.g., access control unit 118, e.g., logical element 620). The above described example structure corresponding to the various means can be used with process 200 (see FIG. 2) stored as suitable instructions or code in memory 116 to implement various aspects of the present invention.

In another aspect of the present invention, a non-transitory, computer-readable medium, having stored thereon computer-readable instructions for providing access control to a hardware resource, comprising instructions configured to cause a computing device to send a transaction signal, the transaction signal including a target address of the hardware resource, a security data associated with an initiator of the transaction signal, and a safety data associated with the initiator, receive the transaction signal, determine whether security access is granted based on the transaction signal, determine whether safety access is granted based on the transaction signal, and allow access to the hardware resource based on both the security access and the safety access being granted. Such a non-transitory, computer-readable medium can be embodied in memory 116 shown in FIG. 1.

Processor 102 may be any programmable microprocessor, microcomputer or multiple processor chip or chips that can be configured by software instructions (applications) to perform a variety of functions, including the functions of the various aspects described above. In some devices, multiple processors may be provided, such as one processor dedicated to wireless communication functions and one processor dedicated to running other applications. Typically, software applications may be stored in the internal memory before they are accessed and loaded into processor 102. Processor 102 may include internal memory sufficient to store the application software instructions. In many devices, the internal memory may be a volatile or nonvolatile memory, such as flash memory, or a mixture of both. For the purposes of this description, a general reference to memory refers to memory accessible by processor 102 including internal memory or removable memory plugged into the device and memory within processor 102 itself.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory, computer-readable or processor-readable storage media may be any storage media that may be accessed by a computer or a processor. By way of example but not limitation, such non-transitory, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory, computer-readable and processor-readable media. Additionally, the operations of a method or algorithm may reside as one or any combination or set of codes and/or instructions on a non-transitory, processor-readable medium and/or computer-readable medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

The invention claimed is:

1. A computing device comprising:
a hardware resource;
a safety configuration register;
a component to send a transaction signal, the transaction signal including a target address of the hardware resource, a security data associated with an initiator of the transaction signal, a safety data associated with the initiator, and a safety master identifier, wherein the safety master identifier allows safety access to the safety configuration register but prevents safety access to the hardware resource when the safety master identifier is set to a first value, and does not prevent safety access to the hardware resource but prevents safety access to the safety configuration register when the safety master identifier is set to a second value; and
an access control unit coupled to the component and the hardware resource, the access control unit to:
receive the transaction signal;
determine whether security access is granted based on the transaction signal;
determine whether safety access is granted based on the transaction signal; and
allow access to the hardware resource based on both the security access and the safety access being granted.

2. The computing device of claim 1, wherein the security data associated with the initiator includes one or more bits indicating a security level of the initiator.

3. The computing device of claim 2, wherein the security data associated with the initiator includes an access domain identifier.

4. The computing device of claim 1, wherein the safety data associated with the initiator includes a safety identifier.

5. The computing device of claim 4, wherein the safety identifier identifies one of a plurality of safety levels.

6. The computing device of claim 1, further comprising:
a logic element included within the access control unit, the logic element to allow access to the hardware resource based on both the security access and the safety access being granted.

7. The computing device of claim 1, wherein the safety master identifier includes a bit indicating a safety master, the safety master allowed to only access the safety configuration register.

8. The computing device of claim 1, wherein the hardware resource is a memory.

9. A computing device comprising:
means for sending a transaction signal, the transaction signal including a target address of a hardware resource, a security data associated with an initiator of the transaction signal, a safety data associated with the initiator, and a safety master identifier, wherein the safety master identifier allows safety access to a safety configuration register but prevents safety access to the hardware resource when the safety master identifier is set to a first value, and does not prevent safety access to the hardware resource but prevents safety access to the safety configuration register when the safety master identifier is set to a second value;
means for receiving the transaction signal;
means for determining whether security access is granted based on the transaction signal;
means for determining whether safety access is granted based on the transaction signal; and means for allowing access to the hardware resource based on both the security access and the safety access being granted.

10. The computing device of claim 9, wherein the security data associated with the initiator includes one or more bits indicating a security level of the initiator.

11. The computing device of claim 10, wherein the security data associated with the initiator includes an access domain identifier.

12. The computing device of claim 9, wherein the safety data associated with the initiator includes a safety identifier.

13. The computing device of claim 12, wherein the safety identifier identifies one of a plurality of safety levels.

14. The computing device of claim 9, wherein the safety master identifier includes a bit indicating a safety master, the safety master allowed to only access the safety configuration register.

15. A method operational in a computing device comprising:
sending, by a component, a transaction signal, the transaction signal including a target address of a hardware resource, a security data associated with an initiator of the transaction signal, a safety data associated with the initiator, and a safety master identifier, wherein the safety master identifier allows safety access to a safety configuration register but prevents safety access to the hardware resource when the safety master identifier is set to a first value, and does not prevent safety access to the hardware resource but prevents safety access to the safety configuration register when the safety master identifier is set to a second value;
receiving, by an access control unit, the transaction signal;
determining, by the access control unit, whether security access is granted based on the transaction signal;
determining, by the access control unit, whether safety access is granted based on the transaction signal; and
allowing, by the access control unit, access to the hardware resource based on both the security access and the safety access being granted.

16. The method of claim 15, wherein the security data associated with the initiator includes one or more bits indicating a security level of the initiator.

17. The method of claim 16, wherein the security data associated with the initiator includes an access domain identifier.

18. The method of claim 15, wherein the safety data associated with the initiator includes a safety identifier.

19. The method of claim 18, wherein the safety identifier identifies one of a plurality of safety levels.

20. The method of claim 15, wherein the safety master identifier includes a bit indicating a safety master, further comprising:
allowing only to the safety master access to the safety configuration register.

21. A non-transitory, computer-readable medium, having stored thereon computer-readable instructions for providing access control to a hardware resource, comprising instructions configured to cause a computing device to:
send a transaction signal, the transaction signal including a target address of the hardware resource, a security data associated with an initiator of the transaction signal, a safety data associated with the initiator, and a safety master identifier, wherein the safety master identifier allows safety access to a safety configuration register but prevents safety access to the hardware resource when the safety master identifier is set to a first value, and does not prevent safety access to the hardware resource but prevents safety access to the safety configuration register when the safety master identifier is set to a second value;
receive the transaction signal;
determine whether security access is granted based on the transaction signal;
determine whether safety access is granted based on the transaction signal; and
allow access to the hardware resource based on both the security access and the safety access being granted.

22. The computer-readable medium of claim 21, wherein the security data associated with the initiator includes one or more bits indicating a security level of the initiator.

23. The computer-readable medium of claim 22, wherein the security data associated with the initiator includes an access domain identifier.

24. The computer-readable medium of claim 21, wherein the safety data associated with the initiator includes a safety identifier.

25. The computer-readable medium of claim 24, wherein the safety identifier identifies one of a plurality of safety levels.

* * * * *